United States Patent

Beatty

[11] Patent Number: 5,785,235
[45] Date of Patent: Jul. 28, 1998

[54] PURGE BLOCK

[76] Inventor: Joel Winford Beatty, 9434 Corlett St., Baton Rouge, La. 70811

[21] Appl. No.: 653,008

[22] Filed: May 24, 1996

[51] Int. Cl.⁶ ........................................ B23K 9/16
[52] U.S. Cl. ............................. 228/42; 228/49.3
[58] Field of Search ............... 228/42, 44.5, 49.3, 228/219

[56] References Cited

U.S. PATENT DOCUMENTS

| | | | |
|---|---|---|---|
| 3,095,844 | 7/1963 | Thielsch | 228/42 |
| 4,828,160 | 5/1989 | Sundholm | 228/42 |
| 5,217,156 | 6/1993 | Schnorrer | 228/219 |
| 5,484,973 | 1/1996 | Gittens et al. | 228/219 |

FOREIGN PATENT DOCUMENTS

| | | | |
|---|---|---|---|
| 37 28 184 | 4/1988 | Germany | 228/219 |
| 781317 | 8/1957 | United Kingdom | 228/42 |

OTHER PUBLICATIONS

Welding & Metal Fabrication, R.A. Sewell, Gas purging for pipe welding, pp. 20, 22, Feb. 1989.

*Primary Examiner*—Samuel M. Heinrich
*Attorney, Agent, or Firm*—Joseph N. Breaux

[57] ABSTRACT

A purge block including a first and second first diameter disk constructed from a substantially rigid material; a resilient disk having a second diameter larger than the first diameter concentrically aligned and secured between the first and second first diameter disks; at least one vent hole formed through the first and second first diameter disks and the resilient disk in a manner to form a pathway through the first and second first diameter disks and the resilient disk; and a positioning mechanism protruding from one of the first and second first diameter disks. The resilient disk is preferably constructed from a heat resistant material. The positioning mechanism is preferably a handle or centrally oriented flexible member attachment device.

1 Claim, 2 Drawing Sheets

12 5,785,235

PURGE BLOCK

TECHNICAL FIELD

The present invention relates to devices utilized for welding together sections of pipe and more particularly to a purging block used to seal off one section of pipe from another to provided a sealed portion of pipe into which a welding gas may be introduced to facilitate making the welding connection between adjoining sections of pipe.

BACKGROUND ART

Fabrication of long pipe runs requires the connection of multiple sections of pipe. These sections are placed end to end and the adjoining ends welded to form an airtight connections. Because of advances in welding technology it is often required to introduce an inert or other type of gas into the pipe sections in order to achieve the quality of welded connection between the pipe sections required for a particular application. The gas is typically introduced into the pipe sections by first inserting one end of a hose that has the other end connected a source of the desired gas into one end of the pipe section, then blocking of the open ends of the pipe with wadded paper or other stuffing material to at least impede escape of the gas to be introduced through the hose. The gas source is then opening and gas introduced into the pipe until welding has been finished. Although this method can result in adequate welds various problems can result by achieving a pipe end seals that are sealed too tightly or not tight enough. If the pipe end is not sealed tightly enough, more gas must be introduced at a higher rate to maintain an adequate gas percentage within the pipe section. More gas usage results in higher costs per weld. If the pipe end is sealed to tightly the gas introduced into the pipe section has no escape path except the gap between the two pipe sections being joined. As the connection is formed between the two pipe sections escaping gas has a smaller and smaller vent hole through which to escape. At a certain point, the pressurized gas escaping through the gap can prevent closure of the weld and requiring the welder to shut off the gas supply before welding can be completed. It would be a benefit, therefore, to have a purge block that was insertable within the open end of a pipe section that included a uniform vent size so that a uniform gas flow regulator could be attached to the gas supply. It would be a further benefit to have a system of purge blocks usable with a different internal diameter pipe that was easily inserted and removed from the end of a pipe section. It would be a further benefit to have a purge block through which the gas supply hose could be inserted to supply gas to the pipe section without complicated sealing process between the purge block and the gas supply hose.

GENERAL SUMMARY DISCUSSION OF INVENTION

It is thus an object of the invention to provide a purge block that is insertable within the open end of a pipe section that includes a uniform vent size.

It is a further object of the invention to provide a purge block system that was lightweight and usable with a variety of different internal diameter pipe that included a plurality of individual purge blocks that are easily inserted and removed from the end of a pipe section.

It is a still further object of the invention to provide a purge block that included a self sealing gas supply hose port that allows a gas supply hose to be inserted through the purge block without following a complicated sealing process to seal gaps between the purge block and the gas supply hose.

It is a still further object of the invention to provide a purge block that achieves all or some of the above objects in combination.

Accordingly, purge block is provided. The purge block includes a first and second first diameter disk constructed from a substantially rigid material, such as metal or wood; a resilient disk having a second diameter larger than the first diameter concentrically aligned and secured between the first and second first diameter disks; at least one vent hole formed through the first and second first diameter disks and the resilient disk in a manner to form a pathway through the first and second first diameter disks and the resilient disk; and a positioning mechanism protruding from one of the first and second first diameter disks.

The resilient disk is preferably constructed from a heat resistant material and more preferably form a section of heat resistant neoprene rubber. The positioning mechanism is preferably a handle or centrally oriented flexible member attachment device. Locating the rope or wire attachment in the center of the purge block allows a tensional force acting on the flexible member attachment device to automatically center the purge block bring the purge block into sealing relationship with the interior wall of the pipe section. If desired, a pair of concentrically aligned holes of a second diameter may be formed through the first and second first diameter disks and a smaller diameter concentrically aligned hole may be formed through the resilient disk to form a self sealing gas supply hose port. When the supply hose port is not being utilized it may function as an additional vent or may be plugged with a plug member supplied for that purpose.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
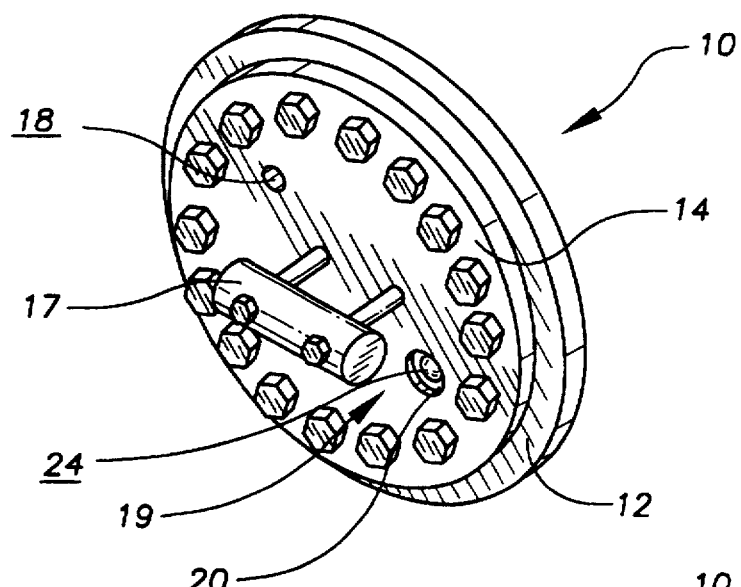
FIG. 1 is a perspective view of a first exemplary embodiment of the purge block of the present invention showing a positioning handle protruding from one of the first and second first diameter disks.

A first exemplary embodiment of the purge block of the present invention adapted for use with ten (10") inch internal diameter pipe is described with reference to FIGS. 1–3 wherein the purge block is generally referenced by the numeral 10. Purge block 10 includes an eleven (11") diameter, resilient disk 12 constructed from three-sixteenths (3/16") inch thick high heat neoprene rubber concentrically sandwiched between first and second, nine and one-half (9½") inch diameter, one-quarter (¼") inch thick, rigid, plywood disks 14,16 (disk 16 shown in FIG. 2) and secured in placed with sixteen bolts spaced around the perimeter of rigid disks 14,16. A positioning handle 17 protrudes from the center of first disk 14. A five-eighths (⅝") inch vent hole 18 is drill formed sequentially through the first disk 14, resilient disk 12, and second disk 16. A gas supply hose port, generally reference by the numeral 19, is provided through purge block 10 to allow a gas supply hose to sealingly pass through the purge block into the pipe section to be welded. Supply hose port is constructed from two concentrically aligned one and one-half inch diameter port holes 20,22 (port hole 22 shown in FIG. 3) and a third concentrically aligned port hole 24 having a diameter of seven-eighths (⅞") inches formed through resilient disk 12. This supply hose port is adapted for receiving a one (1") inch gas supply hose. The diameter of the port holes 18,20,22 should be adjusted according to the most commonly utilized gas supply hose.

Purge block 10 is utilized by inserting purge block 10 into the open end of the pipe section with the plane of rigid disks 14,16 oriented substantially perpendicular to the perpendicular cross-section of the internal diameter of the pipe section. Once purge block 10 has been inserted a desired distance into the open end of pipe section purge block 10 is rotated into place with rigid disks 14,16 oriented substantially parallel with the perpendicular cross-section of the internal diameter of the pipe section. For added sealing, purge block 10 is then pulled a short distance toward the open end of the pipe section until the oversized perimeter edge of resilient disk 12 is curled away from the open end.

Figure 2:
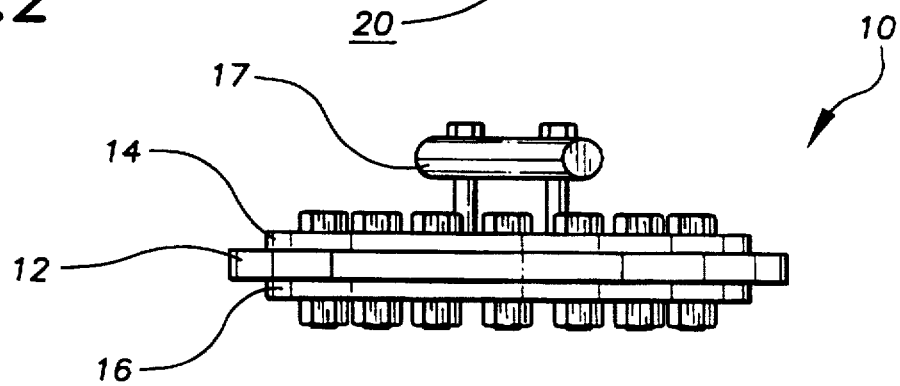
FIG. 2 is a side view of the purge block of FIG. 1.
Figure 3:
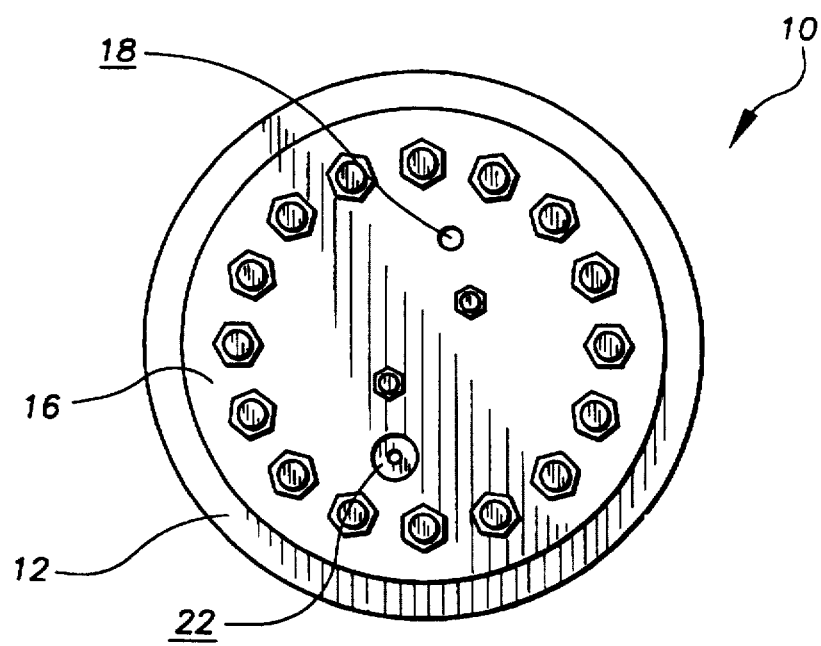
FIG. 3 is a top view of the purge block of FIG. 1.
Figure 4:
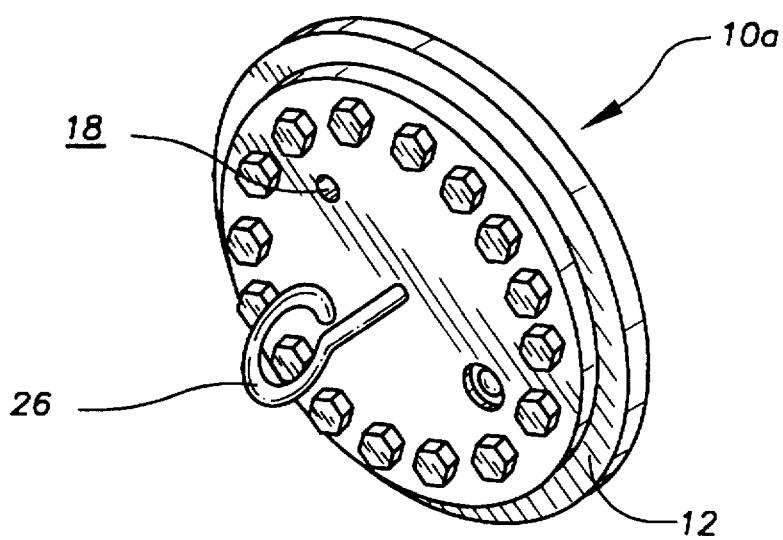
FIG. 4 is a perspective view of a second exemplary embodiment of the purge block of the present invention showing a flexible member attachment device protruding from the center of one of the first and second first diameter disks and an exemplary gas supply hose portal passing through the purge block.
Figure 5:
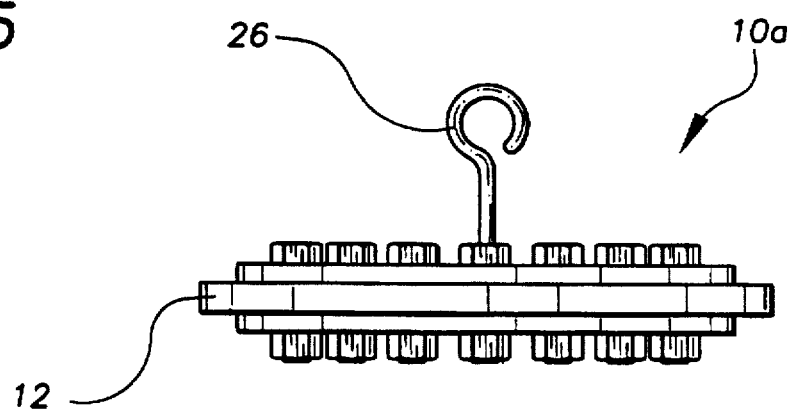
FIG. 5 is a side view of the purge block of FIG. 4.
Figure 6:
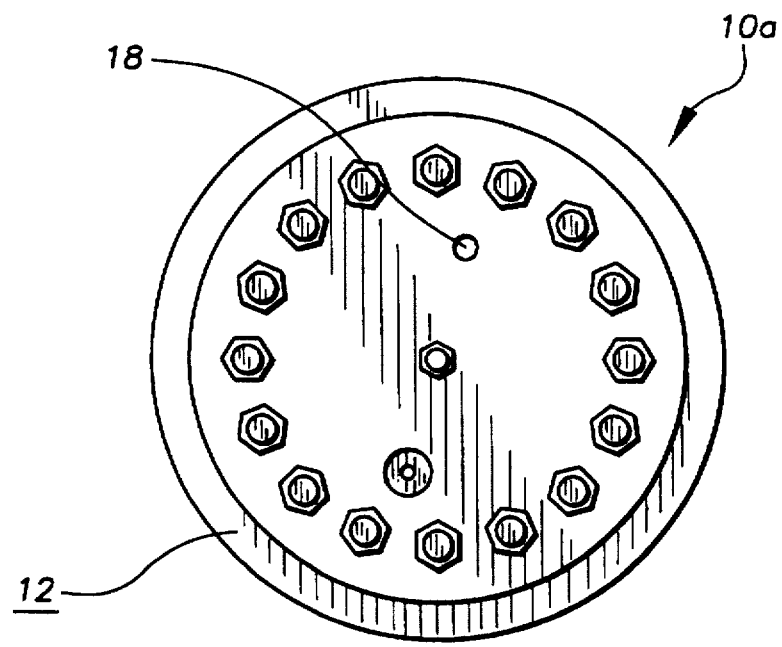
FIG. 6 is a top view of the purge block of FIG. 4.

A second exemplary embodiment of purge block 10a is shown in FIGS. 1-3. As shown in FIG. 1, purge block 10a is identical in all respects to purge block 10 with the exception of replacing the handle 17 of purge block 10 (FIGS. 1-3) with a flexible member attachment device 26. In this embodiment, flexible member attachment device 26 is an eyebolt centered on and secured through rigid disks 14,16 and resilient disk 12. Use of a flexible member attachment device 26 allows a cable or rope to be secured to purge block 10a and pulled through a section of pie to a desired position.

It can be seen from the preceding description that a purge block has been provided that is insertable within the open end of a pipe section, that includes a uniform vent size, that is lightweight, that through providing a variety of different sizes is adaptable for use with a variety of different internal diameter pipe, and that includes a self sealing gas supply hose port that allows a gas supply hose to be inserted through the purge block without following a complicated sealing process.

It is noted that the embodiment of the purge block described herein in detail for exemplary purposes is of course subject to many different variations, in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A purge block comprising:

a first and second, first diameter disk constructed from a substantially rigid material;

a resilient disk having a second diameter larger than said first diameter concentrically aligned and secured between said first and second first diameter disks;

at least one vent hole formed through said first and second first diameter disks and said resilient disk in a manner to form a pathway through said first and second first diameter disks and said resilient disk;

a positioning mechanism intruding from one of said first and second first diameter disk; and a self sealing gas supply hose port including a pair of concentrically aligned holes of a second diameter formed through said first and second first diameter disks and a smaller diameter concentrically aligned hole formed through said resilient disk.

* * * * *